United States Patent [19]
Mercadante et al.

[11] Patent Number: 5,889,465
[45] Date of Patent: Mar. 30, 1999

[54] POWER SERVICE UNIT WITH AUTOMATED DIALER AND OTHER ENHANCEMENTS

[75] Inventors: Frank J. Mercadante, Succasunna; Steven B. Sanders, Jersey City; George Cevasco, Brick Township; Robert C. Page, Ironia; Joseph V. Walsh, Denville, all of N.J.

[73] Assignee: Jersey Central Power & Light Company, Morristown, N.J.

[21] Appl. No.: 685,311

[22] Filed: Jul. 23, 1996

Related U.S. Application Data

[60] Provisional application No. 60/001,427, Jul. 25, 1995.

[51] Int. Cl.[6] .......................... G08B 1/08; H04M 11/04
[52] U.S. Cl. ..................... 340/538; 340/636; 340/333; 307/128; 379/40; 361/90
[58] Field of Search ........................... 340/538, 636, 340/660–664, 693, 333, 331, 332; 307/64–66, 128–131, 150; 320/128, 132, 100, 104; 379/40, 51; 361/90, 93; 455/572–575, 38.3; 364/187, 492; 363/37

[56] References Cited

U.S. PATENT DOCUMENTS

| | | | |
|---|---|---|---|
| 3,702,460 | 11/1972 | Blose ...................................... | 340/310 |
| 4,419,665 | 12/1983 | Gurr et al. ......................... | 340/825.06 |
| 4,454,509 | 6/1984 | Buennagel et al. .................. | 340/825.6 |
| 4,467,314 | 8/1984 | Weikel et al. ............................. | 307/40 |
| 4,611,289 | 9/1986 | Coppola .................................. | 364/492 |
| 4,673,826 | 6/1987 | Masson .................................... | 307/66 |
| 4,719,550 | 1/1988 | Powell et al. .............................. | 307/46 |
| 4,801,813 | 1/1989 | Kersenbrock ........................... | 364/135 |
| 4,929,931 | 5/1990 | McCuen ................................... | 340/636 |
| 5,010,469 | 4/1991 | Bobry ....................................... | 363/17 |
| 5,111,058 | 5/1992 | Martin ..................................... | 307/109 |
| 5,160,851 | 11/1992 | McAndrews ............................. | 307/46 |
| 5,272,382 | 12/1993 | Heald et al. .............................. | 307/66 |
| 5,272,462 | 12/1993 | Teyssandier et al. ............... | 340/310 R |
| 5,281,955 | 1/1994 | Reich et al. ............................. | 340/636 |
| 5,289,045 | 2/1994 | Lavin et al. ............................... | 307/64 |
| 5,307,058 | 4/1994 | Tokizane et al. ................... | 340/825.07 |
| 5,332,927 | 7/1994 | Paul et al. ................................. | 307/46 |
| 5,381,554 | 1/1995 | Langer et al. .......................... | 395/750 |
| 5,455,761 | 10/1995 | Kushiro et al. ......................... | 364/138 |
| 5,483,152 | 1/1996 | Leeb et al. ......................... | 364/464.04 |
| 5,673,304 | 9/1997 | Connor et al. ............................ | 379/45 |

OTHER PUBLICATIONS

Specifications for Converter, Make: Little/Dyna–mite, pp. 38–39, and 43, Jul. 1996.
Gary Kim, Hybrid Fiber/Coaxial–Cable Networks Pass Telephony Reliability Standards, Publ: lightwave, Oct. 1995, pp. 15–18.
Bill Bonney, Providing Reliable Power at Remote Wireless Base Stations, Publ: Power Quality Assurance, Jan./Feb. 1996, pp. 36–40.
Bill Bonney, Powering Wireless Telecom Base Stations, Publ: Telephony, Mar. 25, 1996, pp. 51–56.
DCI Sentry: Power Quality Reporting System–Demonstration Manual, Version 4.0, Dec. 1, 1994.

*Primary Examiner*—Donnie L. Crosland
*Attorney, Agent, or Firm*—William L. Muckelroy, Esq.; Gary N. Lipson, Esq.

[57] ABSTRACT

A power service unit suited for providing conditioned power to a consuming device at a remote location. The power service unit includes a charger/rectifier, a back-up power supply, together an automated dialer that contacts a central monitor in the event there is a disruption in the operation of the power service unit. The charger/rectifier accepts an external AC power and converts the external AC power to an internal DC power. The internal DC power maintains the back-up power supply in a fully charged state and the converter accepts the internal DC power and converts the internal DC power to an external DC power as required by the consuming device.

12 Claims, 2 Drawing Sheets

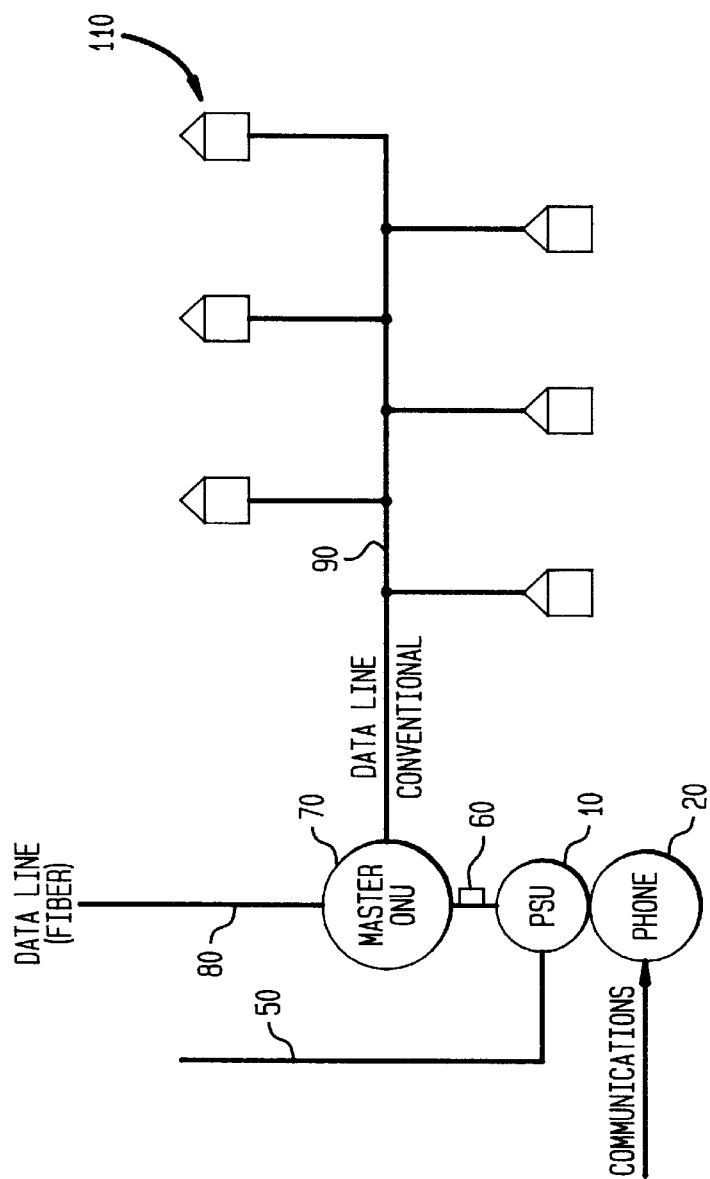
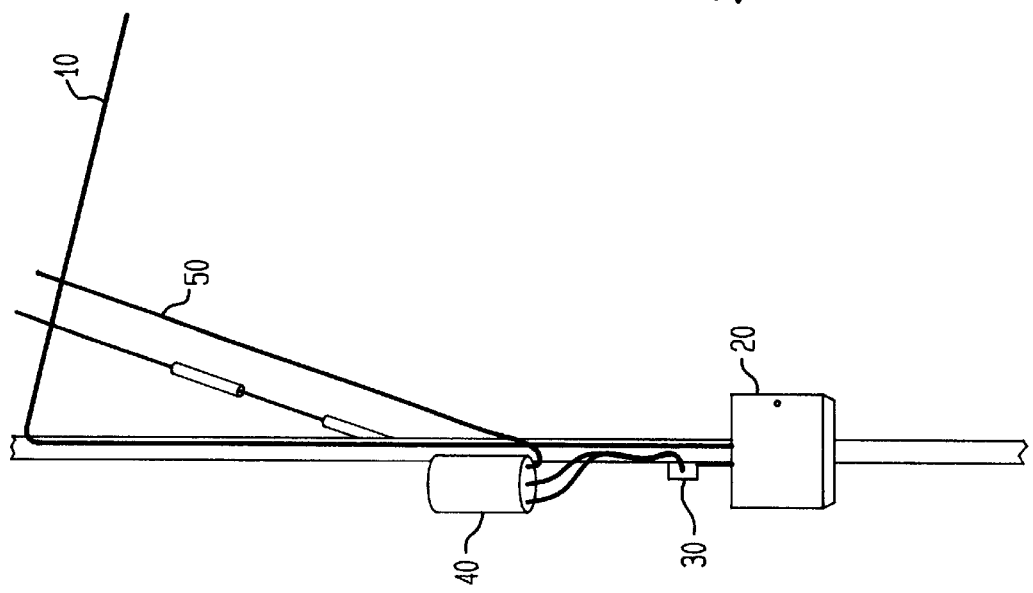

POWER SERVICE UNIT WITH AUTOMATED DIALER AND OTHER ENHANCEMENTS

The applicant claims a filing date of Jul. 25, 1995 based on a provisional application filed by the applicant having a serial number 60/001427 and assigned to Jersey Central Power & Light company.

BACKGROUND

Field of Invention

This invention pertains to a power service unit suited to condition commercial electric power for use by a fiber optic modulator/demodulator unit, provide back up power in the event of failure of the primary power source and notify personnel when there is a disruption in the operation of the power service unit.

Background

The commercial viability of fiber optics for data, voice and video transmissions was apparent by the early 1980's. Fiber optics are superior to conventional transmission mediums in several respects, such as economy of installation and ability to accommodate a large amount of traffic.

The computer industry, burdened by the slow transmission rate of conventional telephone lines, was quick to adapt to the new technology. Data communication between computers is restricted by the limitations inherent in the transmission medium used to communicate from one computer to another. Fiber optics is an ideal medium for computer data transmissions due to a superior rate of data transmission relative to conventional transmission mediums.

To accommodate the commercial users, specialized equipment was designed to modulate and demodulate the signal carried by the fiber optic cable. The purpose of such equipment, referred to as an optical network unit (ONU), is to modulate the outgoing computer transmission so that it can be carried on a fiber optic cable and to demodulate the incoming signal so as to be understood by the computer. The ONU can be thought of as a modem for the fiber optic signal.

This solution works well for the large commercial user who is able to afford the specialized equipment and has the resources to maintain the same. However, the application of fiber optics has now spread to the home user, forcing the telecommunications industry to redesign a delivery system that can accommodate the home based user.

The fiber optic equipment may be provided utilizing a central or distributive theory. In the central theory, the ONUs are housed in a central location, and translation of the fiber optic signal covering a wide geographic area would be handled from a single location. Implementation of this method would require significant capital expense to construct the facility. In addition, the facility would require manned coverage and any interruption in service would affect a significant customer base.

In the distributive theory, each ONU provides service to a relatively small population. For example, there could be one ONU for each five hundred (500) households. This model takes advantage of the improved characteristics of fiber optics by installing the same close to the eventual user. There are different models of ONU available which have individual power requirements. Providing a power service unit for each ONU permits the flexibility of tailoring the output of the power service unit to a specific ONU. In addition, the distributive model eliminates the need for capital expenditure related to the physical facilities and the need for added operational personnel.

The are several issues that relate to installing ONUs in an outside environment. An external power supply is necessary, since the fiber optic signal itself is not capable of carrying a load with sufficient power to drive the modulation/demodulate process. The power fluctuation tolerances of the ONU is very narrow demanding a conditioned electrical source that is not available from the commercial power grid. The ONU will likely be damaged if it is forced to accept a load that is outside the tolerance level for that particular device. In addition, there is a significant likelihood that the fiber optic network will malfunction as it is exposed to the outside elements. It will be difficult to identify the malfunction unless a communications means is available to notify a central monitor of a disruption in service. Installing radio transceivers as the communications means presents its own set of difficulties. Practical considerations suggest that the transceivers would be sized at power and frequency rating necessitating an application for special licensing from the Federal Communication Commission (FCC). This is significant because the process of applying for special licensing through the FCC involves the submission of a number of forms and could take longer than fourteen (14) weeks from the time that the application is submitted to the grant of the license. In contrast, telephone equipment must comply with FCC regulations but does not require special licensing.

Due to the competitive nature of today's telecommunications industry, it is essential that the industry be capable of providing reliable service at a reasonable cost. Relating specifically to fiber optics, the industry has been unable to provide a conditioned power source at a remote location that is able to satisfy both the power and reliability requirements. In addition, the industry has not combined an automatic notification system with a back-up system that continues to provide power to the fiber optic coupler until repairs are made. The combination of a conditioned power supply, a back-up power supply, and a means to alert personnel of a problem is new in the fiber optics industry. The aforementioned combination serves to promote the reliability of the system, and does so at a reasonable cost.

Discussion of Prior Art

The art related to the present invention developed in the area of uninterruptable power supplies and electric utility communication systems.

Uninterruptable Power Supplies

The continuing expansion and world-wide growth of the technically sophisticated industries such as those concerned with computers and computer based products including telecommunication equipment have led to concomitant expansion and growth in support industries, particularly those concerned with power supplies. Technically sophisticated computer installations require assured high quality input power supplies not generally available directly from the line outputs of utilities. Accordingly, a wide range of power improvement approaches have been employed by industry. Early efforts to overcome the aberrations of line power supplies evolved a variety of power conditioning devices, for example, the uniterruptable power supplies (UPS) using a battery charger, batteries, an inverter, and converter to create the AC output.

It is known in the art to provide conditioned power to a targeted device together with an energy reservoir in the event there is a disruption in the primary power source. In U.S. Pat. No. 4,719,550 developed by Powell, et al. in 1988, the apparatus receives commercial AC power as input, conditions the AC power and outputs the result to a load. The apparatus includes a power reservoir in the form of a rechargeable battery that provides substitute power in the event there is a disruption in the commercial AC power.

The next development U.S. Pat. No. 5,010,469, occurred in 1991 by Bobry. Patent '469 teaches an improved method of outputting conditioned power whether the input originates as commercial AC power or is derived from a secondary DC power source. The principal object of this invention is to provide a single transformer to accommodate input from a commercial AC source or a secondary DC source while maintaining a constant output.

In 1992, U.S. Pat. No. 5,160,851 by McAndrews, relates to a power conditioning device with back-up power capability. In particular, Patent '851 is directed to an incremental improvement in the method of storing and delivering power from the back-up system.

The development of this area proceeded with improvements in the quality of the output and the ability to recognize and react to disruptions in the primary power supply. For example, in 1993, U.S. Pat. No. 5,272,382 by Heald, et al., is directed to an improved power delivery system that is capable of monitoring the output from a primary or a secondary power supply. The device is capable of monitoring the load as it is delivered to the consuming apparatus and is capable of regulating the output as required by the consuming apparatus.

The next development is seen in 1994, U.S. Pat. No. 5,332,927 by Paul, et al. Patent '927 discloses an invention directed to an improved method of providing back-up power to a power consuming device. The invention relates to a device where the power supply reservoir is a combination of a battery and a fuel operated engine. The battery supplies power in the event there is a disruption in the primary power supplied to the consuming device. After a predetermined time, the fuel operated engine is signaled into operation providing alternate back-up power and significantly extending the operation of the consuming device.

Development continued in the direction to what is commonly known in the art as uninterruptable power supplies (UPS). The UPS is placed between the standard AC utility outlet and the AC utility plug for consuming device. The UPS includes a battery providing electrical energy in the event of a power failure, an AC to DC converter and a DC to AC inverter converting the electrical energy back from DC to AC. The AC is passed to the consuming device, where the AC current is again converted to DC current for use in the targeted device. The described configuration allows the UPS to maintain the battery in a charged state. Although the purpose of UPS is to provide continuous power, it is not the primary purpose to condition the output. U.S. Pat. No. 5,289,045 by Lavin, et al. in 1994, recognized the inefficiency of converting AC to DC and then back to AC and provide a means to eliminate the redundancy while maintaining the characteristics of the UPS.

The UPS is further developed in U.S. Pat. No. 5,381,554 by Langer, et al. in 1995. Patent '554 teaches a means of networking a plurality of UPSs such that a central processor can monitor and control each individual UPS. In the event of a power disruption, the central processor directs reserve to individual UPSs according to a predefined priority table.

MONITOR and CONTROL OF UTILITY RELATED DEVICES

The power service unit comprises a load conditioning component, a back-up reservoir, together with a telecommunication means capable of notifying a central monitor in the event there is a disruption in the operation of identified components of the power service unit.

It is known in the art that there are devices for monitoring, control, and delivery of utility services. In 1972 U.S. Pat. No. 3,702,460 was issued to Blose. Patent '460 is directed toward providing a communication system for an electric power utility utilizing the neutral conductor of the existing transmission network. The patent relates to a method of communication and control and does not suggest any new uses of the disclosed invention.

U.S. Pat. No. 4,.419,665 issued in 1983 to Gurr, et al. is directed to a method and apparatus for permitting an electric utility to selectively control distribution of its power to a plurality of customer loads. The load management is controlled by a master control station. Patent '665 further teaches a method of error detection whereby the master control station polls each substation to analyze the status of each substation. Patent '665 provides for telephone communication between the master control station and substation; however Patent '665 is directed toward a scheme for power load distribution where the telephone communication link is used to transmit the load determinate messages from the master control station to each of the substations.

Development continued in this area specifically related to the control and distribution of loads. U.S. Pat. No. 4,454,509, issued in 1984 to Buennagel, et al., teaches a method of a radio transmitter to relay load control signals to a plurality of individually addressable load control devices. In this manner, specific devices or groups of devices can be controlled from a central location. U.S. Pat. No. 5,307,058, issued in 1994 to Tokizane, et al., discloses a system directed to the remote supervision and control of loads using a central control and terminal units each being physically connected.

The development in this area continues with U.S. Pat. No. 5,455,761 issued to Kushiro, et al. in 1995. Patent '761 teaches the use of individual terminal units in communication with a central control unit. One terminal unit is provided for each consuming device. System load requirements are calculated by the central control unit using programmed parameters and input from the terminal control units. The load control instructions are then distributed by the central control unit to specific terminal units or groups of terminal units.

The applicant is unaware of any apparatus developed to date that is capable of providing conditioned power to equipment at a remote location with the ability to provide notification in the event there is a operational disruption.

SUMMARY

An automatic, uninterruptable power supply with an internal power reservoir in accordance with the principles of the invention includes a connection to a standard AC utility power, an AC to DC rectifier with charger, a DC power reservoir, a converter and a means of notification in the event of a disruption in the function of the rectifier, the DC power reservoir or the converter.

It is an objective of the present invention to provide reliable and conditioned power to a remotely located power consuming device. It is a further objective of this invention, that the device can be easily reconfigured to accommodate changes in the input and the output requirements.

It is contemplated that the invention is capable of communicating with a central monitor in the event there is a disruption in the functioning of any of its components. It is an objective of this invention to use a means of communications that does not require special licensing. Notification of the change in the state of a load is known in the art. In one embodiment of the present invention, a product entitled POWER QUALITY REPORTING SYSTEM is used to notify a central location that there is an interruption in the operation of a device at an identifiable location. The POWER QUALITY REPORTING SYSTEM was developed by Design Concepts, Int. having its principal place of business at 10656 West Executive Drive, Boise, Id. 83713.

In one embodiment of this invention, it is configured to power an ONU. It is contemplated that the invention provides a reliable, flexible and conditioned power under any circumstance that requires delivery of the same to a remote location. For example, in another embodiment of this invention, it could be used to provide conditioned power and disruption notification to signal translation equipment that is used in the cable television industry.

BRIEF DESCRIPTION OF THE DRAWING

Various objects, features and alternate advantages of the invention will be more fully appreciated as the same becomes better understood with reference to the following detailed description of the present invention when considered in connection with the accompanying drawings, in which:

FIG. 2 is a representation of the preferred embodiment as it appears in actual operation; and FIG. 3 is a representation of an embodiment of the power service unit in combination with an ONU as it appears in actual use.

DETAILED DESCRIPTION

Figure 1:
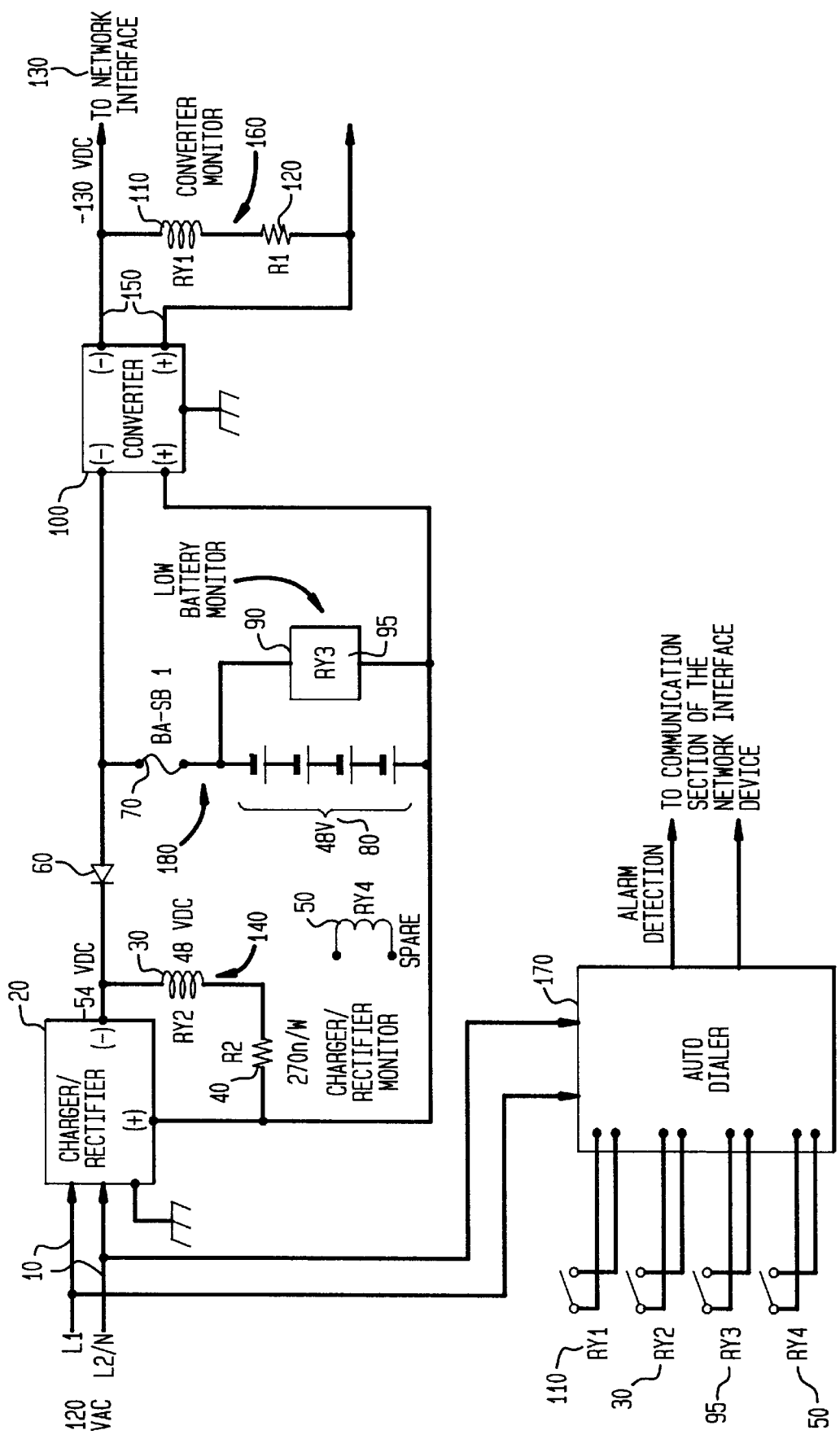
FIG. 1 is an overall block diagram of a preferred embodiment of the system of the present invention.

FIG. 1 shows a system for providing conditioned power to a network interface device. The system comprises an AC power source 10 (typically from a commercial source of supply) whose output is coupled to a standard DC rectifier 20. The charger/rectifier 20 transforms the AC voltage into a first DC voltage. In this embodiment, the AC voltage is assumed to be 120 volts and the first DC voltage is assumed to be −54 volts.

The charger/rectifier 20 is coupled in parallel to a converter 100, such that the negative terminal of the charger/rectifier 20 is coupled to the negative terminal of the converter 100 and the positive terminal of the charger/rectifier 20 is coupled to the positive terminal of the converter 100.

A battery and fuse group 180 is coupled in parallel to the charger/rectifier 20 and to the converter 100. The battery and fuse group 180 includes a series of batteries 80 having a first end and a second end, a fuse 70 and a low battery monitor 90 having a third switch 95. The first end of the batteries 80 are connected to the second end of the fuse 70. The low battery monitor 90 includes a first end and a second end. The first end of the low battery monitor 90 is connected at a junction point between the first end of the batteries 80 and the second end of the fuse 70. The second end of the low battery monitor is connect to the second end of the batteries 80. The first end of the fuse 70 is connected at a junction point between the charger/rectifier 20 and the converter 100.

A charger/rectifier monitor 140 is coupled in parallel to the charger/rectifier 20. The charger/rectifier monitor 140 includes a second switch 30 and a resister 40.

A diode 60 positioned at a junction between the battery and fuse group 180 and the rectifier/charger 20. The diode 60 is positioned such that the anode is directed toward the negative terminal of the changer/rectifier 20.

A network interface device 130 is coupled to and receives output 150 from the converter 100. In this embodiment, the output 150 is equal to −130 VDC. A converter monitor 160 coupled in parallel to the converter 100 at a junction point between the converter 100 and the network interface device 130. The converter monitor 160 comprises a first switch 110 and a resister 120.

In this embodiment there is a fourth switch 50 that is currently unconnected and available for future use.

A power quality reporting system 170. The power quality reporting system 170 is in electrical communication with the first switch, the second switch and the third switch; the fourth switch 50 is not connected being available for further use. If there is a disruption in the output from the converter 100 the first switch 110 will engage. If there is a disruption in the output from the charger/rectifier 20 the second switch 30 will engage. If the output from the batteries 80 falls below a predefined level, the third switch 90 will engage. If there is a disruption in the output from the converter 100, the first switch 110 will engage.

The power quality reporting system includes software that recognizes the engagement of switch 1–4 as an error condition. When an error condition is encountered, the software initiates a communication with a central monitor indicating the switch status and identification of the unit.

In normal operation, the charger/rectifier 20 receives 120 volts AC and outputs −54 volts DC. The converter 100 accepts the −54 volts DC and outputs a load equal to −130 volts DC. The −130 volts DC is received by the network interface 130. The batteries 80 are configured in series providing a combined power output of 48 volts DC. As long as the charger/rectifier 140 supplies a power in excess of 48 volts DC, the batteries 80 are maintained in a charged state.

If there is a disruption in the output from the charger/rectifier 20, the batteries 80 begin to supply power to the circuit. The diode 60 is positioned so as to direct the supply of power toward the converter 100. The charger/rectifier monitor 140 recognizes the disruption, closing switch 30. The closing of switch 30 is recognized by the power quality reporting system 170 which notifies a central monitor of the disruption. In the present embodiment, the batteries are sized so as to provide approximately ten (10) hours of operation for the target device.

A condition in which the power output from the batteries 80 falls below 48 volts DC, results in the closing of switch 95. The closing of switch 95 is recognized by the power quality reporting system 170 which notifies a central monitor of the disruption.

A condition in which there is a disruption in the output from the converter 100, results in the closing of switch 110. The closing of switch 110 is recognized by the power quality reporting system 170 which notifies a central monitor of the disruption. Note that the reporting of this disruption indicates that the target device is no longer receiving power and is out of service. A quick response to this disruption is imperative in order to maintain the integrity of the operation of the target device.

FIG. 2 shows an embodiment of the invention as it appears in actual operation. The optical network unit 40 is coupled to both a conventional telephone line and a fiber optics transmission line. The optical network unit 40 has two functions. The first function is to receive signals from the optical fiber, modulate the signal and pass the signal to the conventional telephone line. The second function is to receive a signal from the conventional telephone line, modulate the signal and pass the signal on to the fiber optics for transmission.

A commercial power line 10 carries a load of 120 volts AC. The commercial power line 10 is coupled to the power service unit 20. The power service unit 20 receives the 120 volts AC from the commercial power line 10 and provides a −130 volt DC output. The −130 volt output is received by the network interface device 30 which in turn drives the optical network unit 40.

FIG. 3 shows one possible embodiment of the power service unit. The power service unit 10 includes a telephone communications link 20 with a central location 30. The central location 30 is notified of predefined disruptions in the operation of the power service unit.

The power service unit 10 is supplied power from a commercial power line 50. A network interface device 60 and an optical network unit 70. The network interface device 60 is coupled at one end to the power service unit 10 and coupled at the other end to the optical network unit 70. The network interface device 60 accepts conditioned power from the power service unit 10 and outputs the same to the optical network device 70.

A fiber optic cable 80 and a conventional telephone line 90. One end of the fiber optic cable 80 is coupled to the optical network unit 70. The other end of the fiber optic cable 80 is coupled to a central fiber optic switching station 100. One end of the conventional telephone line 90 is coupled to the optical network unit 70. The other end of the conventional telephone line 90 provides a backbone for connection to as many as five hundred (500) households 110. All connections associated with fiber optic cable 80 and conventional telephone line 90 are configured so as to permit full duplex communications.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention. Thus, while the invention is illustrated in terms of providing remote conditioned power to optical network devices, it is equally applicable to any remotely situated device that requires conditioned power, such as cable transmission equipment.

we claim:

1. A power service unit receiving external commercial power comprising:
    (a) a charger/rectifier means for converting the external commercial power to an internal direct current, the charger/rectifier means having a negative terminal, the charger/rectifier means having an input and an output;
    (b) a converter means for converting the internal direct current to an external direct current, the converter means being capable of limiting output in response to any load provided by the internal direct current, the converter means having a positive terminal and a negative terminal;
    (c) the negative terminal of the charger/rectifier means is coupled to the negative terminal of the converter means, and the positive terminal of charger/rectifier means is coupled to the positive terminal of the converter means;
    (d) a back-up power supply coupled in parallel to the charger/rectifier means and the converter means, the back-power supply having a positive terminal and a negative terminal, the negative terminal of the back-up power supply is connected at a junction point between the negative terminal of the charger/rectifier means and the negative terminal of the converter means, in normal operation the output from the charger/rectifier means exceeds the output from the back-up power supply such that the back-up power supply is maintained in a charged state; and
    (e) an automated dialer having software, the automated dialer in communication with each operational component of the power service unit, the software being so configured that a disruption of any of operational units causes the automated dialer to initiate a call to a predetermined number connecting the automated dialer to a central monitor, the software causes a message to be transmitted to the central monitor, the message containing a unique address identifying the location of the automated dialer and the operational status of each of the components.

2. A power service unit receiving external commercial power comprising:
    (a) a charger/rectifier means for converting the external commercial power to an internal direct current, the charger/rectifier means having a negative terminal, the charger/rectifier means having an input and an output;
    (b) a converter means for converting the internal direct current to an external direct current, the converter means being capable of limiting output in response to any load provided by the internal direct current, the converter means having a positive terminal and a negative terminal;
    (c) the negative terminal of the charger/rectifier means is coupled to the negative terminal of the converter means, and the positive terminal of charger/rectifier means is coupled to the positive terminal of the converter means;
    (d) a back-up power supply coupled in parallel to the charger/rectifier means and the converter means, the back-power supply having a positive terminal and a negative terminal, the negative terminal of the back-up power supply is connected at a junction point between the negative terminal of the charger/rectifier means and the negative terminal of the converter means, in normal operation the output from the charger/rectifier means exceeds the output from the back-up power supply such that the back-up power supply is maintained in a charged state; and
    (e) an automated dialer having software, the automated dialer in communication with each operational component of the power service unit, the software being so configured that a disruption of any of operational units causes the automated dialer to initiate a call to a predetermined number connecting the automated dialer to a central monitor, the software causes a message to be transmitted to the central monitor, the message containing a unique address identifying the location of the automated dialer and the operational status of each of the components, wherein
        the automated dialer is in communication with the charger/rectifier means, the back-up power supply and the converter means, the software being so additionally configured that a disruption in operation of the charger/rectifier means, the back-up power supply or the converter means units causes the automated dialer to initiate a call to a predetermined number connecting the automated dialer to the central monitor, the software causes a message to be transmitted to the central monitor, the message contains a unique address identifying the location of the automated dialer and the operational status charger/rectifier means, the back-up power supply, and the converter means.

3. An optical power supply unit receiving external AC power from an external source, conditioning the AC power and directing the conditioned AC power to an optical network unit comprising:

(a) a charger/rectifier means for accepting the external AC power and converting the AC power to an internal DC power, the charger/rectifier means includes a positive terminal and a negative terminal;

(b) a converter means for converting the internal DC power to an external DC power the converter means being capable of limiting output in response to any load provided by the internal direct current, the converter means is coupled in parallel to the charger means;

(c) a diode coupled in series to the charger/rectifier means and the converter means, the diode is forward biased relative to the charger means;

(d) a power storage means for providing DC power when no power is being supplied by the charger/rectifier means, the power storage means having a positive terminal and a negative thermal, the negative terminal of the charger/rectifier means is coupled at a junction point between the diode and the negative terminal of the converter means, the positive terminal of the power storage means is coupled at a junction point between the positive terminal of the charger/rectifier means and the positive terminal of the converter means; and (e) a first monitor means to detect a condition such that there is no power output from the changer/rectifier means, a second monitor means to detect a condition such that the power storage means is not maintaining power at some predefined level, a third monitor means to detect a disruption in the external DC power output from the converter means.

4. A power service unit receiving an external AC commercial power, converting the external AC commercial power into an external conditioned power, and delivering the conditioned power to a consuming device comprising:

(i) a power conditioning means for receiving the external AC commercial power as input and converting the input to the external conditioned power, the external conditioned power is received as input by the consuming device, the power conditioning means is sized so as to satisfy the power requirements of the consuming device; and (ii) a communication means for providing notification that there is a disruption in the operation of the power conditioning means, wherein the power conditioning means comprises (a) a charger/rectifier means for converting the external commercial AC power to an internal DC power, the charger/rectifier means having a positive terminal and a negative terminal, the charger/rectifier means having an input and an output;

(b) a converter means for converting the internal DC power to an external DC power, the converter means being capable of limiting output in response to any load provided by the internal DC power, the converter means having a positive terminal and a negative terminal; and (c) the negative terminal of the charger/rectifier means is coupled to the negative terminal of the converter means, and the positive terminal of charger/rectifier means is coupled to the positive terminal of the converter means.

5. An apparatus as claimed in claim 4, further including p1 a diode coupled in series to the negative terminal of the charger/rectifier means and the negative terminal of the converter means, the diode is positioned in the forward bias direction relative to the negative terminal of the charger/rectifier means.

6. An apparatus as claimed in claim 5, further including (a) a fuse having a first end and a second end;

(b) a back-up power supply having a positive terminal and a negative terminal, the back-up power supply receives power and is charged by the internal DC power; and wherein the first end of the fuse coupled at a junction point between the diode and the negative terminal of the converter means, the second end of the fuse is coupled to the negative terminal of the internal back-up power supply, and the positive terminal of the internal back-up power supply is coupled at a junction point between the positive terminal of the charger/rectifier and the positive terminal of the converter means.

7. An apparatus as claimed in claim 6, further including a low battery monitor coupled in parallel to the back-up power supply, the low battery monitor having a first end and a second end, the first end of the low battery monitor is coupled at a junction point between the second end of the fuse and the negative terminal of the back-up power supply, the second end of the low battery monitor is coupled at a junction point between the positive terminal of the back-up power supply and the positive terminal of the converter means.

8. An apparatus as claimed in claim 7, further including a central monitor, wherein the communications means provides notification to the central monitor when there is an interruption in output from the charger/rectifier means.

9. An apparatus as claimed in claim 8, wherein the communications means provides notification to the central monitor when there is a disruption in the charge maintained by the back-up power supply beyond a predetermined limit.

10. An apparatus as claimed in claim 9, wherein a communications means for providing notification to a central monitor when there is an interruption in output from the converter means.

11. An apparatus as claimed in claim 7, wherein the communication means is by way of conventional telephone communication technology.

12. A power service unit comprising:

(a) a commercial power source providing an external power source;

(b) an internal direct current and an external direct current; a charger/rectifier means receiving as input the external power source; the charger/rectifier means converting the external power source to an internal direct current, the charger/rectifier having a positive terminal and a negative terminal;

(c) a converter means having an input and an output, the converter means converting the internal direct current to an external direct current, the converter means being capable of limiting output in response to any load provided by the internal direct current;

(d) the negative terminal of the charger/rectifier means is coupled to the negative terminal of the converter means, and the positive terminal of the charger/rectifier means is coupled to the positive terminal of the converter means;

(e) a fuse having a first end and a second end, a back-up power supply having at least one direct current battery, the back-up power supply having a positive terminal and a negative terminal, the first end of the fuse is coupled at a junction point between the negative terminal of the charger/rectifier means and the negative terminal of the converter means, the second end of the fuse is coupled to the negative terminal of the back-up power supply, the internal direct current is of a greater magnitude compared to the direct current available in the back-up power supply such that the back-up power supply is maintained in a fully charged state;

(f) a diode coupled in series to the negative terminal of the charger/rectifier means and the negative terminal of the converter means, the diode is positioned in the reverse bias direction relative to the negative terminal of the charger/rectifier means;

(g) a charger/rectifier monitor having a first switch and a first resister, the charger/rectifier monitor is coupled in parallel to the charger/rectifier means, the charger/rectifier monitor is configured such that the first switch is normally in the open position, the first switch changes from the open position to the closed position in the event there is a disruption in the operation of the charger/rectifier means;

(h) a converter monitor coupled in parallel to the output of the converter means, the converter monitor having a second switch and a second resister, the converter monitor is configured such that the second switch is normally in the open position, the second switch changes from the open position to the closed position in the event there is a disruption in the operation of the converter means;

(i) a low battery monitor coupled in parallel to the back-up power supply, the low battery monitor having a first end and a second end, the first end of the low battery monitor is coupled at a junction point between the second end of the fuse and the negative terminal of the back-up power supply, the low battery monitor includes a third switch, the low battery monitor is configured such that the third switch is normally in the open position, the third switch changes from the open position to the closed position in the event there is a disruption in the charge maintained by the back-up power supply beyond a predetermined limit; and (j) a telecommunication means electrically coupled to the first switch, second switch and third switch, the telecommunication means is configured so as to communicate with a central monitor in the event there is a condition such that switch one, switch two or switch three is in the closed position, the telecommunication means transmits a signal to a central monitor, the signal includes a unique address identifying the telecommunication means and the operational state of switch one, switch two and switch three.

* * * * *